Feb. 26, 1957 C. E. HERSCHEL ET AL 2,782,579
ARTICLE TRANSFER SYSTEM
Filed Dec. 31, 1952 4 Sheets-Sheet 1

INVENTORS.
CARL E. HERSCHEL
CHARLES D. VANDENBURGH
BY
ATTORNEY.

Feb. 26, 1957 C. E. HERSCHEL ET AL 2,782,579
ARTICLE TRANSFER SYSTEM
Filed Dec. 31, 1952 4 Sheets-Sheet 4

INVENTORS.
CARL E. HERSCHEL
CHARLES D. VANDENBURGH
BY Thomas R. McNally
ATTORNEY.

United States Patent Office 2,782,579
Patented Feb. 26, 1957

2,782,579
ARTICLE TRANSFER SYSTEM

Carl E. Herschel, Newtown Square, Pa., and Charles D. Vandenburgh, Charlestown, Md., assignors to American Viscose Corporation, Philadelphia, Pa., a corporation of Delaware Application December 31, 1952, Serial No. 329,046

16 Claims. (Cl. 53—197)

The present invention relates to the handling and conveying of articles having apertures extending therethrough which may be utilized for receiving portions of apparatus adapted to accomplish the movement of the articles. This invention relates particularly to apparatus for successively loading groups of annular packages onto transfer members, such as rods, tubes, or other elongate articles, so that the groups of packages may be transferred as such through succeeding treatment stations.

Although the invention is broadly applicable to any situation in which it is advantageous to handle apertured articles in groups supported on a removable straight bodied element, it originates through efforts to improve the manufacturing procedure for regenerated cellulose yarn and is described with respect thereto in so far as reference is made to a specific type of apertured article. In the manufacturing of viscose rayon yarn, wound packages thereof are removed from the spinning buckets, stripped of their windings of inferior grade, washed on a machine of the general type disclosed in Patent No. 2,200,197, and then placed in a centrifuging machine to be rotated rapidly about its cylindrical axis for liquid removal. In being removed from the centrifuging machine, such packages are conventionally placed by hand onto a tube supported in cantilever fashion from a carriage or other movable holder. By an alternative arrangement, such packages may be placed on a conveyor which transfers the packages from the centrifuging machine to an inclined chute. When the number of packages required for loading a single tube is collected in the chute, a tube is inserted by hand through such packages which are thereafter supported on the tube and transferred as a group to a carriage or buggy which has portions adapted to engage one or both ends of each tube and to support a plurality of such groups. In using either procedure, it has been found virtually impossible to train workers to exercise sufficient care as to avoid scuffing, disarrangement, and abrasion of the windings of the packages along their inner surfaces. When this occurs, the damage is usually sufficient to require the rejection of perhaps as much as one hundred or more yards of yarn.

It is an object of the present invention to provide an automatic apparatus for progressively loading groups of apertured articles on elongate straight-bodied members without substantial contact with the inner surfaces of the articles during movement of the articles lengthwise of a member whereby the handling of, and abrasion to, such articles may be avoided. It is another object to provide a loading apparatus in accordance with the foregoing object adapted for automatically and progressively feeding such groups of articles to equipment for carrying out additional manufacturing steps. Still another object is to provide an improved system for arranging annular packages of yarn delivered thereto in a substantially constant stream of individual packages into groups of equal number, each group having a common support extending through them, the apparatus being also adapted to discharge the groups of packages in a constant stream.

Other objects, features, and advantages, of this invention will become apparent from the following description and the drawing relating thereto in which.

In general, the objects of the invention are accomplished by an apparatus comprising a plurality of elongate package carrying members, a gravity-type storage dispenser for feeding the members one by one in a direction extending laterally with respect to their lengthwise direction within the dispenser, a rotor having spaced pockets or recesses along its periphery, each pocket adapted for receiving the end portion of a member whereby the members are supported cantilever fashion until released from the rotor, a conveyor system for delivering successive annular packages into juxtaposed end-to-end relationship surrounding a member held by the rotor in a predetermined stationary position adjacent the conveyor system, and another conveyor for receiving the loaded members from the rotor.

Figure 1:
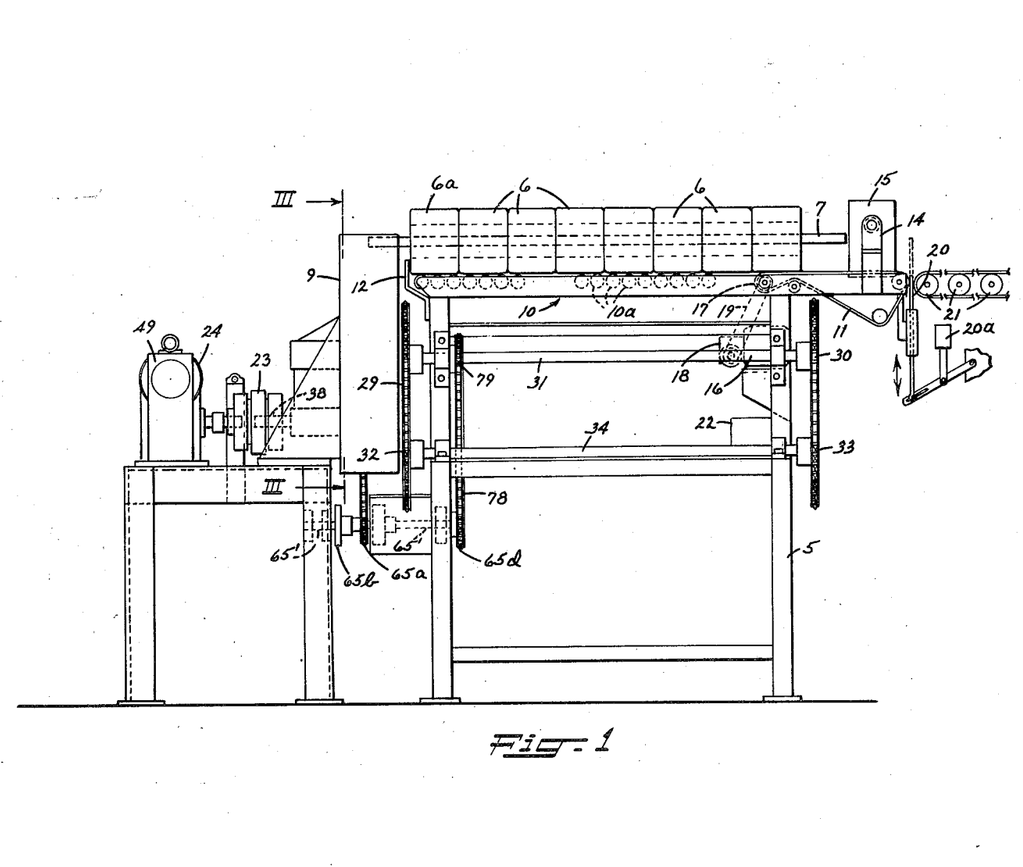
Fig. 1 is a view in elevation of one embodiment of the invention.

Proceeding now to a detailed description of the embodiment as shown in Fig. 1, a frame 5 supports one conveying system for delivering annular packages such as the yarn cakes 6 to positions wherein they surround and preferably do not engage, an elongate member such as the cantilever supported tube 7 positioned in generally parallel and adjacent superposed relationship with a conveyor 10 of the conveying system. The tube 7 is supported by a rotor shown in detail in Figs. 3 and 4 enclosed by the housing 9. When the tube 7 is loaded with the required number of packages 6, the rotor is rotated by a driving mechanism hereinafter described in detail to transfer the tube 7 with the packages 6 resting thereupon to a position wherein the tube and the cakes are placed upon another conveyor 28 supported by the frame 5. The conveying system of which the roller-type conveyor 10 is a part, comprises also an electronically operated belt-type conveyor 11. The rollers 10a of the conveyor 10 are mounted with their axes parallel and extending in a direction that is transverse with respect to the lengthwise direction of the tube 7. The axes of the rollers 10a are disposed substantially within a common plane parallel to the member 7 supported thereover so that the packages 6 may rest on the rollers with the member 7 extending therethrough with substantial clearance with the inner surfaces of the package. The object of this arrangement is to prevent contact of the member with the packages during movement thereof lengthwise of the member 7, thereby avoiding abrasion or disarrangement of the inner windings of the packages. The package 6a which advances further to the left in Fig. 1 is positioned by a detent 12. The other packages 6 are thereafter positioned on top of the rollers 10a in end-to-end juxtaposed relationship by the belt conveyor 11.

The packages are counted as they are carried by the conveyor 11 between a light-source 14 and a light-sensitive photoelectric device 15 applied to receive a beam from the light-source 14. Interruptions in the passage of light therebetween produce changes in the circuit of the device 15 which are amplified electronically as hereinafter described and utilized to actuate a switch 22 for controlling various movements of the machine. A ratchet-type sequence relay switch 22, such as model 85AXA manufactured by the Struthers-Dunn Inc. and described in their catalog H published 1951, may be used as the principal control switch. It controls the flow of electrical power to a small motor 16 which drives a roll 17 and the belt 11 by an interconnecting driving system comprising a motor and speed reduction unit 18, a sprocket chain 19 for connecting sprockets mounted on the roll 17 and the unit 18. The belt 11 receives the packages from a delivery system such as the conveyor 21. When the conveyor 21 is continuously driven, the passage of packages onto the conveyor 11 may be interrupted during movements of the rotor 25 by a vertically reciprocable slide 20 operated by a solenoid 20a. The conveyor 21 may also comprise, as an equivalent delivery device, a plurality of freely rotatable rolls arranged along an inclined path so that the yarn cakes will be propelled therealong to the conveyor 11 by gravity.

Figures 3, 4:
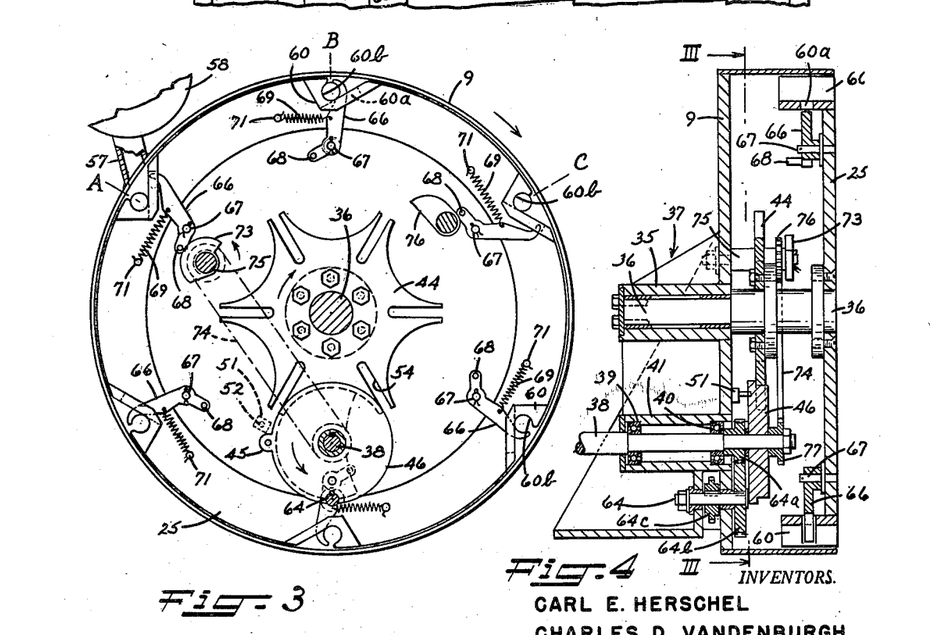
Fig. 3 is an enlarged sectional view of a portion of the apparatus taken along line III—III of Fig. 4.
Fig. 4 is a section view of a portion of the apparatus including that shown in Fig. 3 taken along line IV—IV of Fig. 2.

In addition to controlling the motor 16, the counting switch 22 is used to open and close the circuit for energizing a magnetic clutch 23 which connects the main driving motor 24 and the rotor 25 (see Figs. 3 and 4). Illustrative of the type of clutch preferred is that manufactured by the Sterns Magnetic Mfg. Co. and identified as Style "EE" in its catalog "Bulletin 226." Such a clutch has the advantages of picking up the full load instantly and stopping the driven shaft instantly through operation of its electrical braking mechanism. As this type of clutch is conventional in structure, a detailed description thereof except as hereinafter provided is not considered essential to the description of the present invention. However, when the circuit for the motor 16 is open, the circuit for the clutch 23 is closed whereupon the rotor 25 is caused to rotate to carry a tube 7 and the packages 6 loaded thereon away from the conveyor rolls 10a and to bring another unloaded tube 7 into a loading position over the conveyor.

In the presently described embodiment, the tubes after being loaded with the packages 6 are carried in one separate movement of the rotor to a position wherein the end portions of the loaded tubes are engaged by cleats 27 protruding from two endless chains of a conveyor 28 which may be also supported by the frame 5. The latter conveyor comprises two parallel sprocket chains carried by sprockets 29, 30 mounted on a shaft 31 and sprockets 32, 33 mounted on a shaft 34. Each cleat of a chain is disposed in a direction parallel to the shafts 31 and 34 from a cleat attached to the other chain whereby each tube 7 may be supported by a pair of cleats with its lengthwise direction extending in a direction parallel to the shafts. Thus, a pair of cleats, one on each chain, approximately simultaneously engages a loaded tube 7 as it is released from the rotor 25. The conveyor 28 may be extended or shortened as desired to meet the requirements of a manufacturing process.

The rotor 25 is supported on a shaft 36 which extends through a sleeve portion 35 of a bearing bracket 37. The bearing bracket has another sleeve portion 41 adapted to receiving a drive shaft 38, and anti-friction bearings 39 and 40 therefor. A Geneva-type transmission comprising a cam wheel 44 mounted on an enlarged portion of the shaft 36 and a revolving pin 45 supported by a disc member 46 connects the rotor 25 in drive relationship with the shaft 38. The disc member is fixed on the drive shaft 38 which extends into the driven member of a magnetic-type clutch 23 (see Fig. 1) of which the driving member thereof is constantly rotated by the motor 24 and the gear reduction unit 49.

Various types of conventional clutches may be substituted for the clutch 23. However, the clutch of the magnetic type is preferable since there is but a slight amount of lag in its response to a control system. The circuit therefor is closed by a counting-type relay switch connected to the photoelectric unit 15. This circuit is opened by actuation of a limit switch 51 attached to the housing 9. The push button of the switch extends into the path traversed by the pin 45 as it emerges from a slot of the cam 44. The pin 45 passes over the button 52 which actuates a relay for opening the control circuit of the clutch 23 thereby disengaging the clutch. The pin 45 stops at a position such as that shown in Fig. 3 about 260° away from the region of entrance into the slot which it will next enter. The position of such a slot is that occupied by the slot 54. The time required for the rotation of the pin 45 from the position shown to the point where it enters the slot 54 is about three seconds. This elapse of time is quite desirable since the rotation of the disc 46 is initiated by the operation of the counting relay 22 as it counts the last cake to be placed over the tube 7. The cake as it passes between the light-source 14 and the photo-electric unit 15 still has some distance to travel before it engages the nearest cake supported on the conveyor 10. By the arrangement just described, the pin 45 is revolving through 260° before any motion of the rotor 25 and the tube 7 supported thereby can occur. Meanwhile a cake is passing from a position between the light-source and the unit 15; it arrives in its final position with respect to the length of the tube 7 just before the pin 46 enters the slot 54 to set the rotor in motion.

Considering now the mechanism by which tubes are successively received by the rotor, a feeding device disposed between a chute 56 and the housing 9 of the rotor 25, removes the tubes one by one from the chute and deposits each tube in a separate slot of the rotor as the slots successively revolve past a connecting duct 57 extending between a housing 58 of the feeding device and the housing 9 of the rotor. The feeding device comprises two discs 59 and 61 mounted on a shaft 62, each of which has four notches spaced 90° apart. This shaft is driven from the shaft 38 by a drive system extending from a sprocket 63 mounted on the shaft 62 including three counter shafts 64, 65', and 66' (see Fig. 2).

Figure 5:
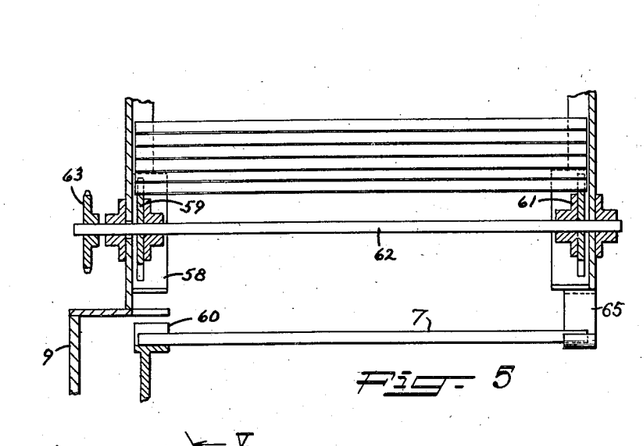
Fig. 5 is a fragmentary sectional view of a feeding device for the rotor shown in Figs. 3 and 4.
Figure 6:
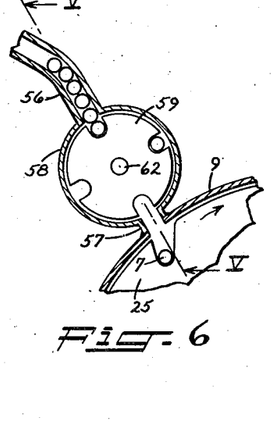
Fig. 6 is a fragmentary sectional view taken along line VI—VI of Fig. 5.
Figure 7:
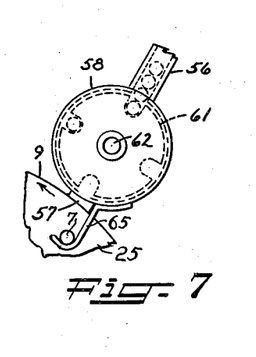
Fig. 7 is a fragmentary end view of the tube feeder shown in Figs. 5 and 6.

The shaft 64 is driven from the shaft 38 by gears 64a and 64b. The shaft 64 has fixed thereon a sprocket 64c connected by a chain 65n to a sprocket 65a on the shaft 65'. A sprocket 65b mounted on the latter shaft is connected by a chain 66n to a sprocket 66a on the shaft 66'. The chain 66n extends around a sprocket 66b on the shaft 66' and the sprocket 63 of the shaft 62 to complete the driving system of the tube feeder shown in Figs. 5 and 7.

The ratio of rotation of the feeding discs 59 and 61 of the tube feeder with respect to the rotor 25 is such that a notch of the disc 59 is rotated past the upper end of the duct 57 with each presentation of a recess of the rotor at the lower end of the duct 57 whereby a tube may be transferred from a notch of the disc 59 into a recess of the rotor. A hook 65 is attached to the housing 58 for the disc 61 to catch one end of a tube as the other end drops into a recessed structure 60 of the rotor. Promptly thereafter a spring-urged pawl 66 swings into position against the end-portions of the tube disposed within the recess in registry with the passageway of the duct 57.

The rotor carries a pawl 66 adjacent each recess thereof. Each pawl is pivotably mounted on a shaft 67 extending from the disc portion of the rotor. The pawl is of generally bell-crank shape with one arm extending into a slot 60a provided in the structure 60 defining each tube-receiving recess, the end portion of the pawl which normally extends through the slot 60a is concavely curved to complementarily fit the exterior surface of the tube. An adjacent surface 60b of the rotor parallel to its axis of rotation is also concavely curved to conform to the exterior contour of the tube so that this surface and that of the pawl may cooperate to function as a clamp for a tube 7. The other arm of the pawl is shorter and supports a cam follower 68; a tension spring 69 is connected between a pin 71 attached to the rotor and the larger arm of the pawl. The cam follower 68 is engaged by a cam 73 which is mounted on a shaft 75 and rotates one revolution with each revolution of the shaft 38. The shaft 75 has fixed thereto a sprocket 76 connected by a chain 74 to a sprocket 77 on the shaft 38. As the shaft 38 and the disc 46 start turning, the cam 73 rotates in the direction of the arrow to engage the cam follower 68 whereby the pawl 66 is forced in a clockwise direction as viewed in Fig. 3 to permit the end portion of the tube 7 within the adjacent recess of the rotor in registry with the passageway of the duct 57. As the cam completes its rotation, the pawl is returned by the spring 69 to a position in engagement with the tube. The movement of the pawl 66 as a result of rotation of the cam 73 is substantially completed by the time the pin 45 enters a slot of the cam 44 to start the rotation of the rotor 25. This is necessary since the axis of rotation of the cam is stationary and the rotor as a whole moves relatively thereto except for the periods during which recesses of the rotor are in registry with the passageway 57.

Operation of the Geneva transmission carries a tube and the adjacent portion of the rotor from a position A adjacent the duct 57 to the topmost position B shown in Fig. 3. Another movement of the rotor carries it to the upper right position C shown in Fig. 3. In revolving from position B, the tube 7 moves toward and engages the inner peripheries of the packages 6 supported on the conveyor 10 and subsequently rolls the packages onto a sloping panel 80. The panel 80 extends the length of the conveyor 10 and is S shaped with respect to a plane normal to the rotor axis. The panel 80 has preferably a polished upper surface such as provided by polished stainless steel. This panel reduces the weight with which the packages 6 bear on the tube 7 until support of the tube 7 by the conveyor 28 is established. As the tube advances from the position B to position C, the cam follower 68 engages a stationary cam 76 which forces the pawl 66 clockwise about its pivotal shaft 67 out of engagement with the tube 7. The forward side of the recess at position C is sloping downward and, as the tube is released, the tube passes from the recess of the rotor in engagement with a cleat 27 of each chain of the conveyor 28. The conveyor 28 is driven by the counter shaft 65' by a sprocket 65d connected by a chain 78 to a sprocket 79 carried on the shaft 31. The conveyor 28 is thus connected in drive relationship with the drive shaft 38 and driven intermittently in timed relationship with the rotor and other mechanisms of the apparatus synchronously connected with the shaft 38.

Figure 8:
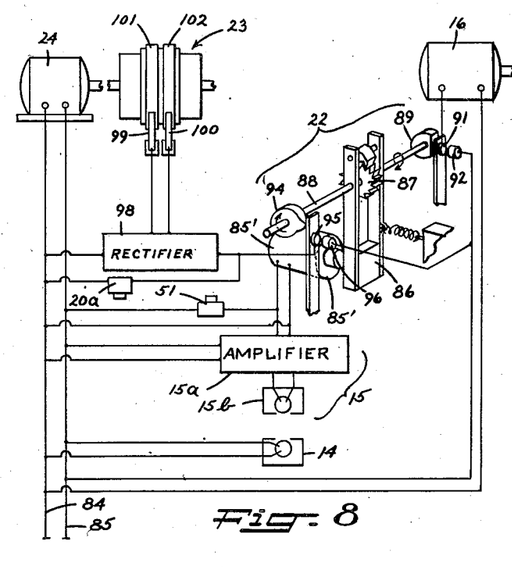
Fig. 8 is a circuit diagram including the electrically operated portions of the apparatus.

The electrical apparatus of the machine is connected as shown in Fig. 8 wherein the main power supply lines 84 and 85 are connected directly to the motor 24, the light-source 14, and an amplifier 15a of the light-sensitive device 15. The amplifier 15a electronically magnifies the signal transmitted thereto from a photo-electric tube 15b. The amplifier is connected with the electro-magnetic coil 85' of the switch 22 for transmission thereto of the product current of the amplifier. At each energization of the coil, the magnetically-sensitive armature 86 of the switch rotates a ratchet 87 mounted on a cam shaft 88. On this shaft is mounted a cam 89 having a flat side for producing break in contact points 91 and 92 during a portion of each revolution of the shaft 88, and another cam 94 having a node portion for producing momentary contact of contact points 95 and 96, points 92 and 96 being stationary and points 91 and 95 being mounted on respective cam followers which bear resiliently against the cams 89 and 94. The cams 89 and 94 are fixed on the shaft so that the flat portion of cam 89 opens contact points 91 and 92 when the cam 94 causes engagement of the contact points 95 and 96.

Thus, during operation, the circuit which energizes the clutch 23 (including a rectifier 98, and brushes 99 and 100 in contact with collector rings 101 and 102 mounted on the driven portion of the clutch) is momentarily closed as contact points 95 and 96 engage. At this same instant, the conveyor motor 16 is stopped by separation of the contact points 91 and 92. The clutch 23 remains energized until the driving pin 45 of the Geneva transmission engages the button 52 of the limit switch 51. When this happens, the relay coil 85' of the switch 22 is energized and the cams are rotated into a position such that the contact points 95 and 96 open and the points 91 and 92 engage, thereby starting the operation of the conveyor motor 16 whereby cakes of yarn are loaded onto a tube 7 positioned over the conveyor 10. By operation of the switch 22, when the switch 51 is closed, the clutch 23 is de-energized and its braking mechanism set. The subsequent delivery of packages onto the conveyor 10 by operation of the conveyor 11 as driven by the motor 16 initiates another cycle such as just described, with the passage of each package between the light-source 14 and the tube 15b producing a progressive rotative movement of the switch cams 89 and 94. The number of teeth on the ratchet 87 equals one greater than the number of cakes of yarn to be loaded onto one tube 7. For example, in building the machine to load eight cakes into each tube, the ratchet 87 would have nine teeth. The additional tooth is required for operation of the limit switch 51.

Figure 9:
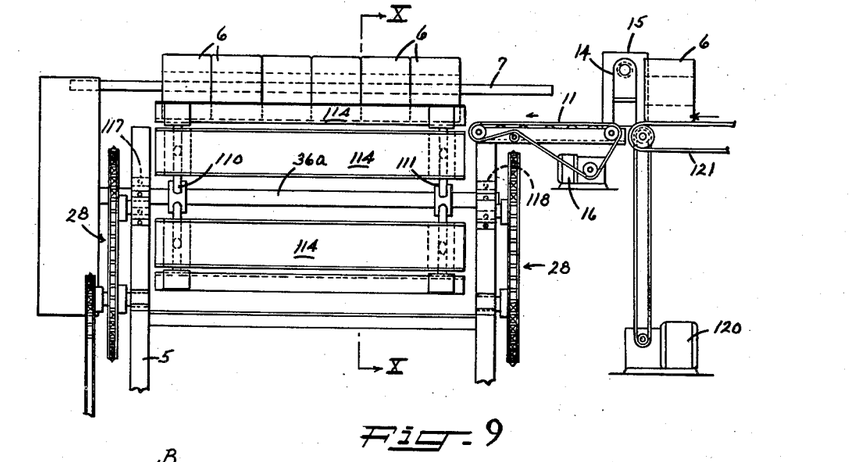
Fig. 9 is a fragmentary elevation of a modified system for loading the article-supporting tubes and for transferring the loaded tubes onto a conveyor.
Figure 10:
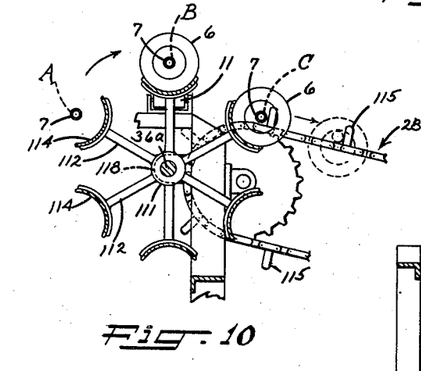
Fig. 10 is an elevation in section taken along line X—X of Fig. 9.

Figs. 9 and 10 illustrate an alternative system for loading the annular articles 6 onto a tube 7 supported by the rotor 25. The system has the further function of delivering the tubes, when loaded, onto the conveyor 28. The shaft 36 which supports the rotor 25 (see Figs. 3 and 4) is extended in Figs. 9 and 10 as extension 36a which supports a reel comprising a pair of spider members 110 and 111 which have radial spokes 112, and troughs 114 of arcuate cross-section, each of which is supported by a spoke of each spider member in longitudinal alignment parallel to the axis of rotation of the shaft 36a. As shown, the reel comprises six troughs spaced angularly with respect to the axis at 60 degrees apart.

In the normal operation of the machine, the tube is received by the rotor 25 at station A, engaged by the pawl 66, and thereafter supported parallel and concentrically with respect to the trough at position A. Each trough passes successively through stations A, B, and C. At each rest period of the rotor, a trough of the reel is supported in one of these stations. The troughs comprise a material, preferably stainless steel which will take a high polish and be substantially frictionless with respect to articles 6 forced longitudinally therethrough. The tube 7 at station B is supported by the rotor so that articles 6 are forced by the conveyor 11 onto the trough in approximately concentric relationship with the tube. The photo-electric counting system may be arranged, as shown in Fig. 8 and described hereinbefore with respect to Figs. 1 and 2, to count a predetermined number of packages transferred into a single trough before energizing the electrically-controlled clutch 23. The resulting movements of the machine transfer the trough loaded with packages received at station B to station C with the tube extending therethrough held out of engagement with the inner surfaces of the packages. Thus the trough rather than the tube supports the packages during the transfer thereof from position B to position C. The conveyor 28 is supported so that the upper pass thereof, i. e., the upper courses of the chains which comprise the conveyor, passes into approximate tangency with the lower part of the cylindrical surface of a tube 7 supported at position C. The tube is released by the rotor 25 in a manner hereinbefore described at station C. The loaded tubes 7 are spaced along the conveyor 28 by cleats 115 attached in uniformly spaced positions along the conveyor 28. The shaft 36a on account of its substantial length is preferably supported in bearings 118 and 117 mounted on portions of the frame 5. The troughs 114 are of such length as to rotate between the spaced portions of the frame on which the bearings are mounted. In the arrangement shown in Fig. 9, a driving unit 120 for the conveyor 121 is preferably controlled by the relay switch 22 with the drive motor of the unit 120 being substituted for the motor 16 in the circuit diagram of Fig. 8 and the motor 16 being connected directly to the supply lines 84 and 85. Thus the conveyor 121 operates intermittently and the conveyor 11 operates continuously. The conveyor 11 is driven at a more rapid rate than the conveyor 121 to space the articles 6 delivered by the conveyor 121 onto the conveyor 11 lengthwise of the latter conveyor to thus render the photo-electric counting apparatus effective in counting each article.

Figure 2:
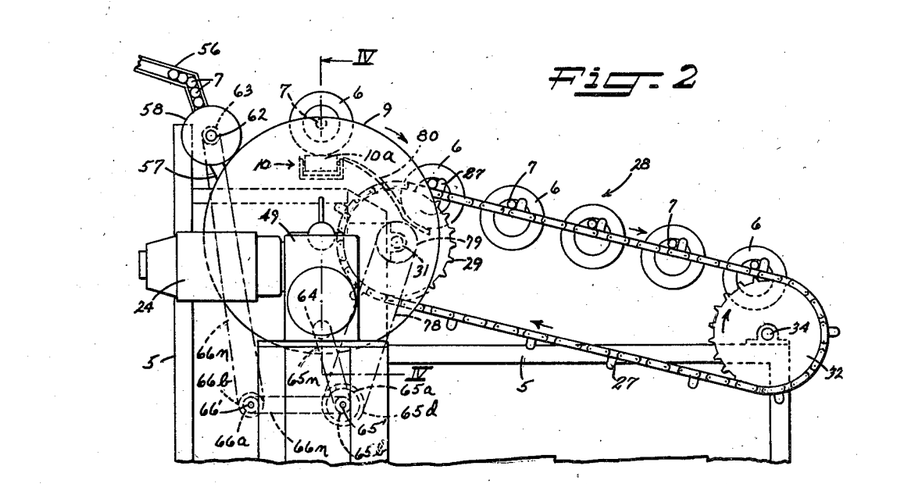
Fig. 2 is an elevation of the apparatus shown in Fig. 1 as viewed from another direction.
Figure 11:
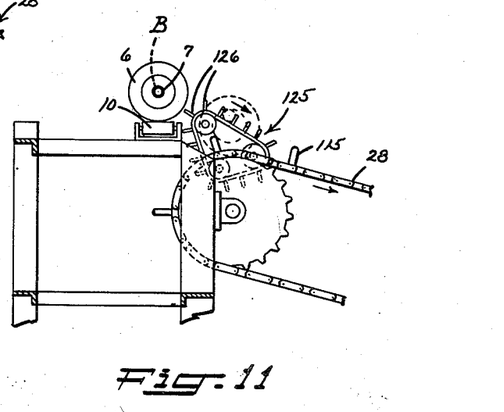
Fig. 11 is a fragmentary elevation in section of the apparatus of Figs. 1 and 2 showing schematically an auxiliary tube-transferring conveyor.

Fig. 11 illustrates a conveyor 125 which may be incorporated into the apparatus illustrated in Figs. 1 and 2 to provide positive support of the ends of the tubes 7 as they move in loaded condition out of station B. The provision of such a conveyor enables lighter gauge tubes to be used which would be otherwise bent within the clamp portions 60 and 66 of the rotor. Such a conveyor also makes it possible to use springs 69 of lighter construction and less power is required to rotate the rotor 25 against the resistance imposed by the cam motion thereof than when springs 69 of heavier gauge are used. A tube 7 moving out of the station B is engaged by a pair of cleats 126 of the conveyor 125 slightly before or immediately after the tube engages the inner walls of the surrounding articles 6. The conveyor 125 moves approximately concurrently with the rotor 25 so that the conveyor and the rotor cooperate to deposit both ends of a tube 7 approximately simultaneously onto the conveyor 28. The conveyor 125 may be driven by a constantly running motor or such a motor may be connected in parallel relationship with the motor 16 in the circuit diagram, Fig. 8, or be controlled by the relay switch 22 so that it operates only during movements of the rotor 25. However, the constant operation of the conveyor has been found very satisfactory, especially when the conveyor is driven at a rate slightly greater than the linear rate at which the rotor travels along the circumference thereof at which the tubes 7 are supported. The conveyor may be of metallic chain construction although it is preferably of rubber and fabric belt construction.

While a preferred embodiment of the invention has been shown and described, it is to be understood that changes and variations may be made without departing from the spirit and scope of the invention as defined in the appended claims.

We claim:

1. Apparatus for handling apertured articles comprising a plurality of elongate straight-bodied members adapted to extend with clearance through the apertures of a group of such articles, a rotor having recesses spaced along its periphery, each recess being adapted to receive an end portion of a member, means for storing a plurality of the members in lengthwise parallel arrangement, said storing means having an opening for discharging the members therethrough one by one in a direction normal with respect to their lengthwise direction, said storing means and an end portion of the opening being relatively disposed with respect to the rotor for transferral of an end portion of each member into a recess of the rotor in registry with the opening, means spaced from the rotor in a direction parallel to its axis of rotation for providing additional support to a member having one end portion supported within a recess in registry with the opening, the support means having a surface upon which a portion of such a member loosely rests with its length substantially parallel to said axis, means for clamping a member within each recess whereby a member is cantilever-supported by the rotor and said clamping means when the recess in which such member is held passes out of registry with the supporting means and the opening, means connected in timed relationship with the rotor for actuating the clamping means before said recess therewith moves out of registry with the opening, means connected in timed relationship with the rotor for actuating the clamping means to release the member held in each recess at a fixed point angularly spaced with reference to the rotor axis from said opening and loading means disposed adjacent to a path traversed by the members as they move from said opening to said fixed point for carrying a plurality of said articles over the unsupported end of a supported member into positions wherein the member extends through the apertures of such articles.

2. Apparatus for handling apertured articles comprising a plurality of elongate straight-bodied members, a rotor having recesses spaced along its periphery, each recess being adapted to receive an end portion of a member, means for storing a plurality of members in lengthwise arrangement substantially parallel to the axis of the rotor, said storing means having an opening for discharging the members therethrough one by one in a direction that is normal with respect to their lengthwise direction or disposition within the storing means, said storing means and an end portion of the opening being relatively disposed with respect to the rotor for transferral of an end portion of each member into a recess of the rotor brought into registry with the opening, means laterally spaced from the rotor for providing additional support to a member having one end-portion supported within a recess in registry with the opening, the supporting means having a surface for loosely engaging a portion of the member upon which the member rests with its lengthwise direction in substantially parallel relationship with the axis of the rotor, means for clamping a member in each recess whereby the member is cantilever-supported by the rotor and said clamping means independently of the supporting means as the rotor moves each recess and the tube supported therein out of registry with the opening, means connected in timed relationship with the rotor for actuating the clamping means before the recess portion of the rotor associated therewith moves out of registry with the opening, means connected in timed relationship with the rotor for actuating the clamping means to release the member held in each recess at a point angularly spaced with reference to the rotor axis from said opening, loading means disposed adjacent to a path traversed by said member as they move from said opening to said point of release for carrying a plurality of said articles over the unsupported end of a supported member into positions wherein the member extends through the apertures of such articles, and conveying means disposed for engagement with the members at said point of release and having surfaces spaced in a direction parallel to the rotor axis for engaging portions of the members on opposite sides of the center of gravity for such members and their loads.

3. Apparatus for handling apertured articles comprising a plurality of elongate straight-bodied members adapted to extend with clearance through the apertures of a group of such articles, a rotor having recesses spaced along its periphery, each recess being adapted to receive an end portion of a member, means for storing a plurality of the members in lengthwise parallel arrangement, said storing means having an opening for discharging the members therethrough one by one in a direction normal with respect to their lengthwise direction, said storing means and an end portion of the opening being relatively disposed with respect to the rotor for transferral of an end portion of each member into a recess of the rotor brought into registry with the opening, means spaced from the rotor for providing additional support to a member having one end portion supported within a recess in registry with the opening, the supporting means having a surface upon which a portion of such a member rests in substantially parallel alignment with the axis of the rotor, means for clamping a member within a recess whereby the member is cantilever-supported by the rotor and said clamping means independently of the supporting means, means connected in timed relationship with the rotor for actuating the clamping means before the recessed portion of the rotor associated therewith moves out of registry with the opening, means for intermittently driving the rotor to bring successive recesses thereof into registry with the opening during periods of rest between the intermittent movements, said clamping means remaining in engagement with respective members as said members held in the recesses are progressively moved through a series of positions of rest, means connected in timed relationship with the rotor for actuating the clamping means to release the member held in each recess as the respective recessed portion of the rotor comes to a position of rest at least two movements of the rotor away from said opening, a conveyor extending underneath and approximately parallel to the lengthwise direction of the region occupied by a member in an intermediate position of support by the rotor, the conveyor being spaced below said path whereby the articles may be advanced therealong with the axis of the articles aligned substantially parallel to the lengthwise direction of the conveyor with the adjacent overhanging member extending through the apertures of the articles in spaced relationship with their inner surfaces.

4. Apparatus as defined in claim 3 comprising means for feeding the apertured articles to the conveyor with the axes of the articles aligned substantially parallel to the lengthwise direction of the conveyor.

5. Apparatus for handling apertured articles comprising a plurality of elongate straight-bodied members, a rotor having recesses spaced along its periphery, each of said recesses being adapted to receive an end portion of a member, means for storing a plurality of the members in lengthwise arrangement substantially parallel to the axis of the rotor, said storing means having an opening for discharging the members therethrough one by one in a direction that is normal with respect to their lengthwise direction of disposition within the storing means, said storing means and an end portion of the opening being relatively disposed with respect to the rotor for transferral of an end portion of each member into a recess of the rotor brought into registry with the opening, means spaced from the notched portion of the rotor in a direction parallel to its axis for providing additional support to a member having one end-portion supported within a recess in registry with the opening, the supporting means having a surface upon which a portion of the member spaced from the rotor rests with its lengthwise direction in substantially parallel relationship with the axis of the rotor, means for clamping a member in each recess whereby the member is cantilever-supported by the rotor and said clamping means independently of the supporting means, means connected in timed relationship with the rotor for actuating the clamping means before the recessed portion of the rotor associated therewith moves out of registry with the opening, a conveyor for successively receiving members from the rotor having elements spaced longitudinally along the conveyor which pass through the arcuate path of the members supported in the rotor, means associated in timed relationship with the rotor for actuating the clamping means to release each member as it passes along the portion of the path crossed by said elements, means for intermittently driving the rotor to bring successive recesses thereof into registry with the opening during periods of rest, another conveyor extending approximately parallel to the axis of the rotor underneath an intermediate position of rest successively occupied by each member supported by the rotor along said path, means for feeding said apertured articles onto the second conveyor with the axis of the articles aligned substantially parallel with the lengthwise direction of said conveyor, the second conveyor being spaced below said position of rest whereby the articles may be collected on the conveyor with the adjacent member extending through the central openings without contact with the articles.

6. Apparatus as defined in claim 5 comprising a surface for loosely supporting a portion of a member having an end portion supported in a recess in registry with said opening, the supporting surfaces being spaced from the recess in a direction parallel to its axis for supporting the member in approximately parallel relationship with the axis.

7. Apparatus for handling apertured articles comprising a plurality of elongate straight-bodied members adapted to extend with clearance through the apertures of a group of such articles, a rotor having a plurality of recesses spaced along and extending radially inwardly from its periphery, each recess being adapted to receive an end portion of a member, said rotor comprising means associated with each recess for clamping the end portion of the member within the recess to support the remainder of the member therefrom in cantilever relationship aligned in a direction parallel to the rotor axis, means for intermittently driving the rotor, actuating means for engaging and momentarily opening the clamping means associated with each recess to receive a member immediately after the recess rotates past a fixed point and during a period of rest of the rotor, means for engaging and opening the clamping means at a second fixed point spaced by an angle greater than that traversed by the rotor in one continuous movement thereof, a conveyor having an upwardly-facing article-supporting surface extending parallel to the rotor axis underneath the region occupied by a member in a position of rest after advancement from the first-fixed point by at least one continuous movement of the rotor, a second conveyor in article-transferring relationship with the first conveyor, electrical means for driving the second conveyor, the second conveyor being disposed for delivering articles onto the end portion of the first conveyor which is further away from the rotor whereby the articles are pushed therealong to cause extension of a member disposed at rest adjacent the first conveyor, through the articles pushed thereonto by the second conveyor, electronic counting means associated with the second conveyor disposed for registering the passage of an article over the second conveyor, control means for the electrical driving means of the second conveyor responsive to operation of the driving means of the rotor and connected with the counting means for operation of the second conveyor during periods of rest of the rotor, the counting means being adapted to maintain the second conveyor in operation during the passage of a predetermined number of articles thereover.

8. Apparatus as defined in claim 7 comprising a third conveyor having its longitudinal direction extending in transverse and spaced relationship with the axis of the rotor immediately underneath the region occupied by a member at its position of release from the rotor at the second fixed point, said conveyor having spaced endless sections for engaging the end portions of each member released from the rotor without engagement of the articles supported on the member between said portions, and means for driving the third conveyor in a direction extending away from said axis of rotation.

9. Apparatus as defined in claim 7 comprising means for feeding the members to said rotor, the feeding means comprising means for storing a plurality of the members in coextensive relationship substantially parallel to the axis of the rotor, said storage means having an opening for discharging the members one by one in a direction that is lateral with respect to their length, a second rotor having spaced coaxial circular elements connected for rotation together, the peripheries of the elements having uniformly angularly spaced notches, each notch of one element being in opposed angular agreement with the axis of the elements, each pair of opposed notches being adapted to receive one member, said elements rotating at close clearance within stationary concentric housings, one of said housings being laterally disposed from the first-named rotor and having an opening therethrough in communication with the periphery of the rotor for transferring the end portion of a member into any recess of the rotor disposed adjacent the first-named fixed point during predetermined periods of rest of the rotor.

10. Apparatus for handling a plurality of elongate straight bodied members comprising a rotor having a plurality of separately operable clamping means spaced along a circle in concentric relation with its axis of rotation, each clamping means adapted to receive and grip an end portion of a member of such length as to support the remainder of the member in cantilever relation with the rotor, means for feeding the members one by one to successive clamping means at a fixed receiving station, said feeding means being arranged to support the members in an alignment in which the lengths thereof are approximately parallel to said axis of the rotor, said feeding means and the rotor being relatively disposed for transferral of the end portion of a member into a clamping means disposed by the rotor within said station in a position of registry with the feeding means, means connected in timed relation with the rotor for actuating each clamping means to open it on arriving in said position of registry with the feeding means, said actuating means operating to close the clamping means into gripping relation with a member just prior to movement of the clamping means out of said position, means for driving the rotors to bring successive clamping means into registry with the feeding means, said clamping means remaining in gripping relation with respective members while each of said members so held is progressively moved through an arcuate path to a station at which each member is released from the rotor, means connected in timed relationship with the rotor for actuating each clamping means to release the member held thereby as the clamping means passes through the releasing station, and means mounted adjacent the path traversed by the members between the feeding means and the releasing station for loading an intermediate section of each member in respect to its length.

11. Apparatus for handling a plurality of elongate straight bodied members comprising a rotor having a plurality of separately operable clamping means spaced along a circle in concentric relation with its axis of rotation, each clamping means adapted to receive and grip an end portion of a member of such length as to support the remainder of the member in cantilever relation with the rotor, means for feeding the members one by one to successive clamping means at a fixed receiving station, said feeding means being arranged to support the members in an alignment in which the lengths thereof are approximately parallel to said axis of the rotor, said feeding means and the rotor being relatively disposed for transferral of the end portion of a member into a clamping means disposed by the rotor within said station in a position of registry with the feeding means, means connected in timed relation with the rotor for actuating each clamping means to open it on arriving in said position of registry with the feeding means and to close the clamping means into gripping relation with a member just prior to movement of the clamping means out of said position, means for driving the rotors to bring successive clamping means into registry with the feeding means, said clamping means remaining in gripping relation with respective members while each of said members so held is progressively moved through an arcuate path to a station at which each member is released from the rotor, means connected in timed relationship with the rotor for actuating each clamping means to release the member held thereby as the clamping means passes through the releasing station, means mounted adjacent the path traversed by the members between the feeding means and the releasing station for loading an intermediate section of each member in respect to its length, and means for receiving the loaded members in said position of the rotor at which the members are released therefrom comprising portions disposed adjacent to spaced sections of the members at each side of their respective loaded sections as supported by the rotor at the instant of release.

12. Apparatus for handling a plurality of elongate straight bodied members comprising a rotor having a plurality of separately operable clamping means spaced along a circle in concentric relation with its axis of rotation, each clamping means adapted to receive and grip an end portion of a member of such length as to support the remainder of the member in cantilever relation with the rotor, means for feeding the members one by one to successive clamping means at a fixed receiving station, said feeding means being arranged to support the members in an alignment in which the lengths thereof are approximately parallel to said axis of the rotor, said feeding means and the rotor being relatively disposed for transferral of the end portion of a member into a clamping means disposed by the rotor within said station in a position of registry with the feeding means, means connected in timed relation with the rotor for actuating each clamping means to open it on arriving in said position of registry with the feeding means and to close the clamping means into gripping relation with a member just prior to movement of the clamping means out of said position, means for intermittently driving the rotors to bring successive clamping means into registry with the feeding means during periods of rest between successive intermittent movements, said clamping means remaining in gripping relation with respective members while each of said members so held is progressively moved through a series of positions of rest, means connected in timed relationship with the rotor for actuating each clamping means to release the member held thereby as the rotor comes to a position of rest after at least two of said intermittent movements of the rotor carrying such clamping means away from said station, means mounted adjacent the path traversed by the members between the feeding means and the said position of release for loading an intermediate section of each member in respect to its length while occupying an intermediate position of rest as supported by the rotor, and means for receiving the loaded members in said position of the rotor at which the members are released therefrom comprising portions disposed adjacent to spaced sections of the members at each side of their respective loaded sections as supported by the rotor at the instant of release.

13. Apparatus for handling apertured articles comprising a plurality of elongate straight-bodied members adapted to extend with clearance through the apertures of a group of such articles, a rotor having a plurality of separately operable clamping means spaced along a circle in concentric relation with its axis of rotation, each clamping means adapted to receive and grip an end portion of a member of such length as to support the member in cantilever relation with the rotor, means for feeding the members one by one to successive clamping means as they revolve past a fixed receiving station, said feeding means supporting the members in an alignment in which the lengths thereof are approximately parallel to said axis of the rotor, said feeding means and the clamping means being relatively disposed for transferral of the end portion of a member into a clamping means when disposed by the rotor within said station in a position of registry with the feeding means, means connected in timed relationship with the rotor for actuating each clamping means to open it before it arrives in said position of registry with the feeding means and to close the clamping means into gripping relation with a member just prior to movement of the clamping means out of said position, means for intermittently driving the rotor to bring successive clamping means into registry with the feeding means during periods of rest between successive intermittent movements, said clamping means remaining in gripping relation with respective members while each of said members so held is progressively moved through a series of positions of rest, means connected in timed relation with the rotor for actuating each clamping means to release the member held thereby as the rotor comes to a position of rest at which such clamping means has been carried through at least two of said intermittent movements away from said station, conveying means extending in a direction parallel to the rotor axis adjacent and parallel to the lengthwise direction of a region occupied by a member in an intermediate position of rest as supported by the rotor, the conveying means being spaced with respect to said region to advance said articles toward the rotor with the inner peripheries of the articles supported on the conveying means surrounding but having clearance with a member supported in said region, and means connected in timed relation with the rotor for traversing packages lengthwise of the conveying means during periods of rest of the rotor.

14. Apparatus as defined in claim 13 comprising control means for the package traversing means for limiting the operation thereof to loading each member to the extent that the unsupported end portion of the member is left exposed and extending beyond the articles loaded thereon, and means for receiving the loaded members from the rotor at said position of release comprising portions spaced for engaging only the end portions of the released member.

15. Apparatus as defined in claim 14 wherein the receiving means comprises two endless conveyors and means for supporting and driving the conveyors along spaced parallel paths extending transversely to the axis of the rotor and into proximity with the arcuate paths swept by the end portions of the members while supporting the rotor.

16. Apparatus for handling apertured articles comprising a plurality of elongate straight-bodied members adapted to extend with clearance through the apertures of a group of such articles, a rotor having a plurality of separately operable clamping means spaced along a circle in concentric relation with its axis of rotation, each clamping means adapted to receive and grip an end portion of a member of such length as to support the member in cantilever relation with the rotor, means for feeding the members one by one to successive clamping means at a fixed receiving station, said feeding means supporting the members in an alignment in which the lengths thereof are approximately parallel to said axis of the rotor, said feeding means and the clamping means being relatively disposed for transferral of the end portion of a member into a clamping means when disposed by the rotor within said station in a position of registry with the feeding means, means spaced from the rotor in a direction parallel to said axis for providing additional support for a member having one end portion supported by a clamping means in registry with the feeding means, said supporting means having a surface upon which a portion of such a member loosely rests in substantially parallel alignment with the axis of the rotor, means connected in timed relationship with the rotor for actuating each clamping means to open it as it arrives in said position of registry with the feeding means and to close the clamping means into gripping relation with a member just prior to movement of the clamping means out of said position, means for intermittently driving the rotor to bring successive clamping means into registry with the feeding means during periods of rest between successive intermittent movements, said clamping means remaining in gripping relation with respective members while each of said members so held is progressively moved through a series of positions of rest, means connected in timed relation with the rotor for actuating each clamping means to release the member held thereby as such clamping means comes to a position of rest at least two of said intermittent movements of the rotor carrying such clamping means away from said station, conveying means extending in a direction parallel to the rotor axis adjacent and parallel to the lengthwise direction of a region occupied by a member in an intermediate position of rest as supported by the rotor, the conveying means being spaced with respect to said region to advance said articles toward the rotor with the inner peripheries of the articles supported on the conveying means surrounding but having clearance with a member supported in said region, and means connected in timed relation with the driving means for traversing packages lengthwise of the conveying means during periods of rest of the rotor.

References Cited in the file of this patent

UNITED STATES PATENTS

| Number | Name | Date |
|---|---|---|
| 828,865 | Spain | Aug. 14, 1906 |
| 1,358,910 | Winkley | Nov. 16, 1920 |
| 1,930,640 | Bradley et al. | Oct. 17, 1933 |
| 2,005,375 | Jones et al. | June 18, 1935 |
| 2,139,553 | Little | Dec. 6, 1938 |
| 2,337,528 | Stuckert | Dec. 21, 1943 |